(12) United States Patent
Foster et al.

(10) Patent No.: US 6,316,143 B1
(45) Date of Patent: Nov. 13, 2001

(54) ELECTRODE FOR RECHARGEABLE LITHIUM-ION BATTERY AND METHOD OF FABRICATION

(75) Inventors: Donald L. Foster, Laurel; Jeffrey Wolfenstine, Silver Spring; Jeffrey Read, West Friendship, all of MD (US); Wishvender K. Behl, Ocean, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/469,781

(22) Filed: Dec. 22, 1999

(51) Int. Cl.[7] ........................................................ H01M 4/58
(52) U.S. Cl. ................................ 429/218.1; 429/231.95; 29/623.5
(58) Field of Search ............................ 429/218.1, 231.95, 429/231.9, 231.8, 217; 29/623.5, 623.1, 623.4

(56) References Cited

U.S. PATENT DOCUMENTS 5,677,083 * 10/1997 Tomiyama ........................... 429/194
5,707,756 * 1/1998 Inoue et al. .......................... 429/57
5,928,812 * 7/1999 Xue ..................................... 429/304
5,965,293 * 10/1999 Idota et al. ........................ 429/218.1

\* cited by examiner

Primary Examiner—Stephen Kalafut
Assistant Examiner—Ray Alejandro
(74) Attorney, Agent, or Firm—Paul Clohan, Jr.; U. John Biffoni; William V. Adams

(57) ABSTRACT

An electrode for a rechargeable lithium-ion battery is formed by mixing stanous oxide (SnO) and lithium nitride ($Li_3N$) in a stoichiometric ratio of 2 moles of $Li_3N$ to 3 moles of SnO to form a mixture, milling the mixture to obtain a milled powder, and processing the milled powder in accordance with an electrode-forming technique. The electrode forming technique can be any one of die pressing, spraying, doctor-blading and rolling. Conductive additives, such as carbon and binders (PVDF, cellulose and Teflon), can be introduced during the processing step. Preferably, the method is carried out in a dry, inert atmosphere of argon or helium. As a result of the invention, a smaller, lighter and more efficient lithium-ion battery is produced.

19 Claims, 3 Drawing Sheets

ELECTRODE FOR RECHARGEABLE LITHIUM-ION BATTERY AND METHOD OF FABRICATION

GOVERNMENT INTEREST

The invention described herein may be manufactured, used, and/or licensed by or for the United States Government.

BACKGROUND OF THE INVENTION

1. Field of the Invention

The present invention generally relates to an electrode for a rechargeable lithium-ion battery and to a method of fabrication thereof.

2. Description of the Prior Art

Lithium-ion batteries traditionally use lithium metal oxides ($LiMO_2$ where M=Co or Ni) as cathodes and carbon anodes. The batteries are so named because lithium ions are shuttled back and forth on charge and discharge between the anode and the cathode. On charge, the ions are electrochemically extracted or deintercalated from the lithium metal oxide cathode and inserted or intercalated in the carbon anode. On discharge, the lithium ions are deintercalated from the carbon anode and intercalated into the cathode.

Of all the carbon anode materials that can be used, graphite provides the most capacity, intercalating one lithium per six carbon atoms to form the phase $LiC_6$. More recently, it has been shown that the graphite can be replaced by materials such as SnO or $SnO_2$ which have almost twice the gravimetric capacity as graphite. The materials are reduced at the anode to form first Sn and lithium oxide. For example, for SnO, the reaction may be written as:

$$2Li^+ + SnO + 2e^- \rightarrow Sn + Li_2O \quad (1)$$

This reaction is irreversible, and results in considerable capacity loss on the first cycle due to the formation of $Li_2O$. Upon further charging of the cell, the tin alloys with lithium. Several intermetallic lithium-tin phases are formed. Finally, the phase $Li_{4.4}Sn$, the phase of highest lithium content, is formed as follows:

$$4.4Li^+ + Sn + 4.4e^- \rightarrow Li_{4.4}Sn \quad (2)$$

Since the alloying of tin is reversible, the battery can then cycle reversibly provided that fracturing of the alloyed tin particles does not cause the active material from losing electrical contact with the anode substrate and irreversible capacity loss. This type of capacity loss is a recurrent problem with this type of electrode. The problem may be overcome only by using materials of extremely small particle size that are separated by an electrochemically inert oxide matrix. However, up to the present, techniques for developing such materials of extremely small particle size have not been provided for ductile materials such as tin.

Furthermore, according to the previous state of the art, processes for development of lithium ion batteries or cells begin with SnO as the active anode material in the lithium-ion cell. Charge from the cathode is required to reduce the SnO to Sn. In order to do this, extra cathode material has had to be added to the cell, and the resultant battery has been large, heavy and of unsatisfactory efficiency.

SUMMARY OF THE INVENTION

The present invention generally relates to electrodes for rechargeable lithium-ion batteries, and to a method of fabricating same. More particularly, the method of the invention comprises a novel method of preparing negative electrodes for rechargeable lithium-ion batteries, which method results in more efficient, lighter or smaller chargeable lithium-ion batteries than batteries having metal oxide anodes of the type MO or $MO_2$, where M=Sn, Pb, Ge, Si, Ag and similar metals, as well as glasses formed from these oxide materials. The method of the invention replaces the metal oxide with a mixture of the metal and $Li_2O$. The method is applicable to many metal oxides, but the application of the method to SnO, as well as to $SnO_2$ and tin oxide glasses, is the preferable application of the method.

The method of the present invention, which involves reacting the SnO with lithium nitride ($Li_3N$), eliminates the irreversible capacity loss associated with the process of equation (1) above because the electrochemical reaction of equation (1) is replaced by a chemical reaction that takes place during the milling process, in accordance with the following:

$$2Li_3N + 3SnO \rightarrow 3Sn + 3Li_2O + N_2 \uparrow \quad (3)$$
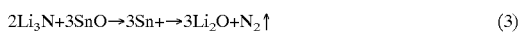

As a result of the present invention, a lighter, smaller and more efficient power source is provided. Moreover, the invention provides a process for producing tin of a smaller particle size in an $Li_2O$ matrix, than can be achieved by simply mixing $Li_2O$ and Sn, and grinding them together. Whereas larger particle size materials yield more readily to cracking, mechanical degradation, and electrical isolation of active material as cycling continues, the smaller particle size material provided in accordance with the present invention is less prone to such stresses, and provides a longer life cycle for the lithium-ion battery.

Therefore, it is a primary object of the present invention to provide a rechargeable lithium-ion battery.

It is an additional object of the present invention to provide a method for fabricating a rechargeable lithium-ion battery.

It is an additional object of the present invention to provide a method which results in the development and use of extremely small particle size materials.

It is an additional object of the present invention to provide a rechargeable lithium-ion battery which is smaller in size, lighter, and more efficient than batteries of the prior art.

The above and other objects, and the nature of the invention, will be more clearly understood by reference to the following detailed description, the associated drawings, and the appended claims.

DETAILED DESCRIPTION OF THE INVENTION

The invention will now be described in more detail with reference to the various figures of the drawings.

As mentioned previously, the invention includes a novel method of preparing negative electrodes for rechargeable lithium-ion batteries, the method representing an improvement in rechargeable lithium-ion batteries having metal oxide anodes of the type MO or $MO_2$, where M=Sn, Pb, Ge, Si, Ag and similar metals, as well as glasses formed from such oxide materials. The method replaces the metal oxide with a mixture of metal and $Li_2O$. The method is applicable to many metal oxides, but the application of the method to SnO as well as $SnO_2$ and tin oxide glasses, is preferable.

The method involves the following steps:

(1) Mix stanous oxide (SnO) powder and lithium nitride ($Li_3N$) powder in a stoichiometric ratio of two moles of $Li_3N$ to three moles of SnO.

Figure 1:
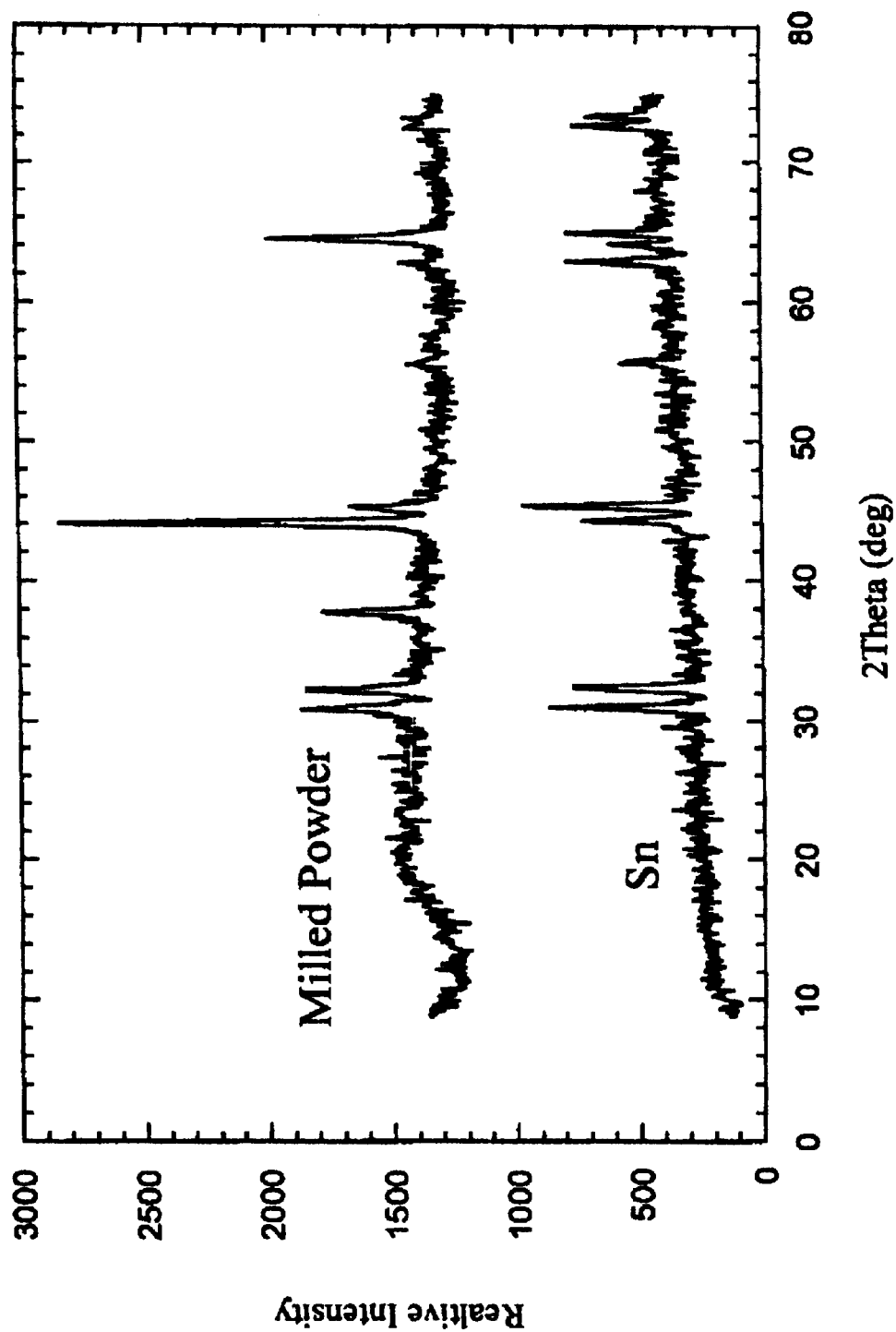
FIG. 1 is a graphical illustration of a diffraction pattern obtained for material prepared in accordance with the present invention.

(2) Place the mixture of powders from step (1) into ajar mill or other milling device, and mill the mixture until the SnO and $Li_3N$ have reacted as shown by complete disappearance of the X-ray diffraction patterns for crystalline SnO and $Li_3N$, and the subsequent appearance of the X-ray patterns for amorphous $Li_2O$ and crystalline Sn. FIG. 1 shows that the diffraction pattern obtained for material milled in a rolling jar mill for five days at ambient temperature, in accordance with the invention, matches the standard powder pattern for tin metal. The milling process should be considered complete when the $Li_3N$ and SnO have been consumed to the greatest extent possible, and only Sn and $Li_2O$ remain.

(3) Process the anode with the milled powder by die pressing, spraying, doctor-blading, rolling or other standard electrode forming technique. Conductive additives such as carbon and binders, such as PVDF, cellulose or Teflon, may be added as needed. The substrate should be copper, nickel or similar metal that does not alloy with lithium. For safety reasons, it is recommended that as much of the above processes as possible be carried out in a dry, inert atmosphere, such as argon or helium.

The method of the present invention, as just described, and involving the reaction of SnO with $Li_3N$ eliminates the irreversible capacity loss associated with equation (1) mentioned above due to the fact that the electrochemical reaction of equation (1) above is replaced, in accordance with the invention, by a chemical reaction that takes place during the milling process. Such chemical reaction has been previously described above with reference to equation (3).

Referring to equations (1) and (3), it should be noted that the products of the equations are the same, except that equation (3) produces nitrogen gas which escapes. Both reactions yield a 1:1 stoichiometric mixture of Sn and $Li_2O$.

Figure 2:
FIG. 2 is a scanning electron micrograph of the product prepared in accordance with the present invention.

Referring to FIG. 2, the scanning electron micrographs shown therein indicate that the tin particles formed by the procedure of the present invention are of extremely small particle size. In fact, many particles are 100 nanometers or less in size. The tin metal particles are the lighter color particles in the scanning electron back-scattered image. This small particle size of tin cannot be achieved through ordinary milling procedures due to the softness of the tin particles. It is believed that the small particle size is produced by the method of the present invention because of a solid state reaction during the milling process. Tin nanoparticles are formed as reactants by the method of the present invention.

The invention is designed to solve the two problems mentioned above. That is to say, previous state of the art techniques begin with SnO as the active anode material in the lithium ion cell, and charge from the cathode is required to reduce the SnO to Sn. Thus, prior art techniques require that extra cathode material be added to the cell, and the resulting battery is large, heavy and less efficient.

Figure 3:
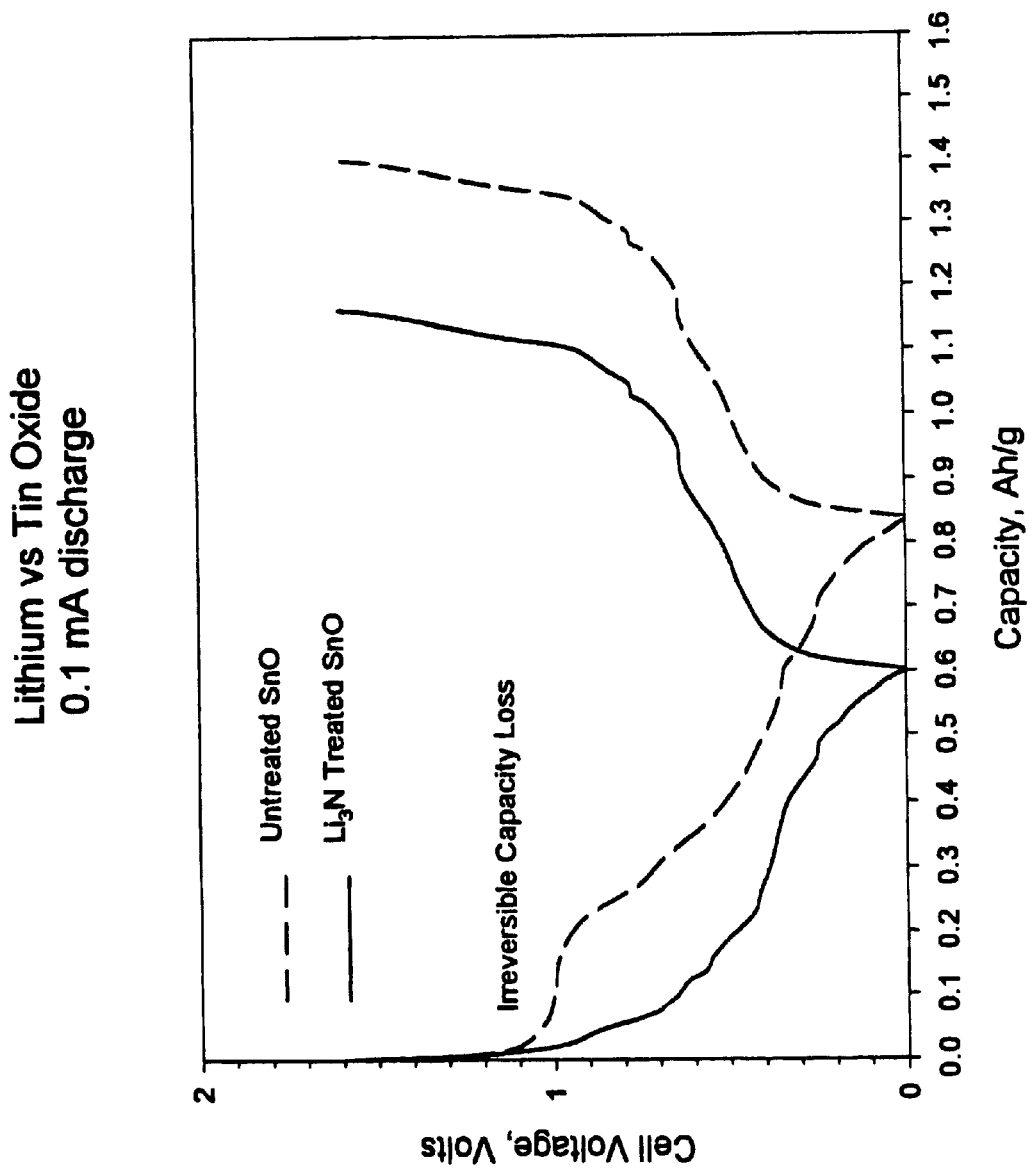
FIG. 3 is a plot of cell voltage versus capacity for a product prepared in accordance with the present invention (solid line) and for a product prepared in accordance with the prior art (dashed line).

In contrast, as a result of the present invention, the resultant battery is smaller, lighter and more efficient than those of the prior art. In that regard, FIG. 3 shows a plot of cell voltage versus capacity for two cells, one resulting from treatment of SnO with $Li_3N$ in accordance with the present invention (see the solid line graph in FIG. 3), and the other resulting from untreated SnO (see the dashed line graph in FIG. 3). The capacity of the untreated material in the plateau at approximately one volt represents the reduction of SnO to Sn. This plateau is not present for the material milled with $Li_3N$ in accordance with the invention. This confirms the results of the X-ray diffraction to the effect that the reaction described by equation (3) has taken place.

As mentioned above, in addition to resulting in a lighter, smaller and more efficient power source, the present invention provides a means for producing tin of a smaller particle size in an $Li_2O$ matrix, than can be achieved by simply mixing $Li_2O$ and Sn, and grinding them together as evidenced by the back-scattered scanning electron micrograph shown in FIG. 2. It is generally accepted that small "nanoparticle" material will cycle more efficiently. Larger particle size material, as is typical in the prior art, yields more readily to cracking, mechanical degradation, and electrical isolation of the active material as cycling continues. In contrast, in accordance with the present invention, the smaller particle size material is less prone to such stresses, and can be anticipated to provide a longer life cycle.

The method of the present invention can be applied in any area which a ductile second phase with an extremely small particle size is desired in an oxide matrix. This has high potential in the area concerned with toughening of structural ceramics, such as $ZrO_2$, $Y_3Al_5O_{12}$, etc., through the addition of a ductile phase metal, such as Ni, Al, Cu etc., where it is known that a higher toughness is obtained as the size of the ductile second phase particle decreases.

To summarize, the invention provides a 1:1 stoichiometric mixture of $Li_2O$ and tin metal. This is needed for a lithium-ion battery anode to minimize capacity loss. The invention also provides an intimate mixture of $Li_2O$ and nanosize particulate tin. This is necessary to maximize the cycle life of a lithium-ion battery electrode.

While preferred forms and arrangement have been shown in illustrating the invention, it is to be understood that various changes and modifications can be made without departing from the spirit and scope of this disclosure.

What is claimed is:

1. A method of fabricating an electrode for a rechargeable lithium-ion battery, comprising the steps of:
   a. mixing stanous oxide SnO and lithium nitride $Li_3N$ in a stoichiometric ratio of 2 moles of $Li_3N$ to 3 moles of SnO to form a mixture;
   b. milling the mixture to obtain a milled powder through a reaction as follows:

$$2Li_3N+3SnO \rightarrow 3Sn+3Li_2O+N_2\uparrow;$$

and
   c. forming said electrode for said rechargeable lithium-ion battery by coating a metal substrate with the milled powder.

2. A method of fabricating an electrode for a rechargeable lithium-ion battery, comprising the steps of:
   a. mixing stanous oxide SnO and lithium nitride $Li_3N$ in a stoichiometric ratio of 2 moles of $Li_3N$ to 3 moles of SnO to form a mixture;
   b. milling the mixture to obtain a milled powder containing tin particles of 100 nanometers or less in size; and c. forming said electrode for said rechargeable lithium-ion battery by coating a metal substrate with the milled powder.

3. A method of fabricating an electrode for a rechargeable lithium-ion battery, comprising the steps of:

a. mixing stanous oxide SnO and lithium nitride $Li_3N$ in a stoichiometric ratio of 2 moles of $Li_3N$ to 3 moles of SnO to form a mixture;

b. milling the mixture until X-ray diffraction patterns for crystalline SnO and $Li_3N$ completely disappear; and c. forming said electrode for said rechargeable lithium-ion battery by coating a metal substrate with the milled powder.

4. A method of fabricating an electrode for a rechargeable lithium-ion battery, comprising the steps of:

a. mixing stanous oxide SnO and lithium nitride $Li_3N$ in a stoichiometric ratio of 2 moles of $Li_3N$ to 3 moles of SnO to form a mixture;

b. milling the mixture until X-ray diffraction patterns for amorphous $Li_2O$ and Sn appear; and c. forming said electrode for said rechargeable lithium-ion battery by coating a metal substrate with the milled powder.

5. A method of fabricating an electrode for arechargeable lithium-ion battery, comprising the steps of:

a. mixing stanous oxide SnO and lithium nitride $Li_3N$ in a stoichiometric ratio of 2 moles of $Li_3N$ to 3 moles of SnO to form a mixture;

b. milling the mixture until all $Li_3N$ is consumed; and c. forming said electrode for said rechargeable lithium-ion battery by coating a metal substrate with the milled powder.

6. A method of fabricating an electrode for a rechargeable lithium-ion battery, comprising the steps of:

a. mixing stanous oxide SnO and lithium nitride $Li_3N$ in a stoichiometric ratio of 2 moles of $Li_3N$ to 3 moles of SnO to form a mixture;

b. milling the mixture until only Sn and $Li_2O$ remain; and c. forming said electrode for said rechargeable lithium-ion battery by coating a metal substrate with the milled powder.

7. The method of claim 1, wherein the coating technique of step c comprises a coating technique selected from the group consisting of die pressing, spraying, doctor-blading, and rolling.

8. The method of claim 1, further comprising the step of introducing at least one additive during step c.

9. The method of claim 8, wherein said at least one additive comprises at least one conductive additive.

10. The method of claim 9, wherein said at least one additive comprises carbon and binders.

11. The method of claim 10, wherein said binders are selected from the group consisting of polyvinylidene fluoride, cellulose and polytetrafluoroethylene.

12. The method of claim 1, wherein the processing of step c is carried out on a substrate which does not alloy with lithium.

13. The method of claim 12, wherein the substrate is selected from the group consisting of copper and nickel.

14. The method of claim 1, further comprising the step, prior to step a, of providing a dry, inert atmosphere in which the method is carried out.

15. The method of claim 14, wherein the atmosphere is selected from the group consisting of argon and helium.

16. An electrode for a rechargeable lithium-ion battery formed by the method recited in claim 1.

17. The electrode of claim 16, wherein said electrode comprises a negative electrode.

18. The electrode of claim 16, wherein said electrode includes tin particles of 100 nanometers or less in size.

19. A rechargeable lithium-ion battery including the electrode of claim 16.

* * * * *